(12) United States Patent
Abt et al.

(10) Patent No.: US 9,113,150 B2
(45) Date of Patent: *Aug. 18, 2015

(54) SYSTEM AND METHOD FOR RECORDING COLLABORATIVE INFORMATION

(71) Applicant: INTERNATIONAL BUSINESS MACHINES CORPORATION, Armonk, NY (US)

(72) Inventors: William F. Abt, Nashua, NH (US); Bryce A. Curtis, Woodland Park, CO (US); Peter J. Parente, Durham, NC (US); Frank A. Schaffa, Hartsdale, NY (US); Peter H. Westerink, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 42 days.

This patent is subject to a terminal disclaimer.

(21) Appl. No.: 14/017,943

(22) Filed: Sep. 4, 2013

(65) Prior Publication Data
US 2014/0003798 A1 Jan. 2, 2014

Related U.S. Application Data

(63) Continuation of application No. 12/784,709, filed on May 21, 2010, now Pat. No. 8,559,794.

(51) Int. Cl.
H04N 7/26 (2006.01)
H04N 19/87 (2014.01)
(Continued)

(52) U.S. Cl.
CPC .......... *H04N 19/00921* (2013.01); *H04N 5/76* (2013.01); *H04N 9/8042* (2013.01); *H04N 9/8211* (2013.01); *H04N 19/137* (2014.11); *H04N 19/17* (2014.11); *H04N 19/50* (2014.11); *H04N 19/87* (2014.11); *H04N 19/96* (2014.11)

(58) Field of Classification Search
None
See application file for complete search history.

(56) References Cited

U.S. PATENT DOCUMENTS 7,225,194 B2  5/2007  Muno et al.
7,349,944 B2  3/2008  Vernon et al.
(Continued)

FOREIGN PATENT DOCUMENTS

GB    2273803 A    6/1994

OTHER PUBLICATIONS

Edmond, B. "Multimedia at Work: Harvesting Resources for Recording Concurrent Videoconferences" IEEE Computer Society. Apr.-Jun. 2009. pp. 92-95.

(Continued)

*Primary Examiner* — Hung Dang
*Assistant Examiner* — Sunghyoun Park
(74) *Attorney, Agent, or Firm* — Tutunjian & Bitetto, P.C.; Preston J. Young

(57) ABSTRACT

A system and method for recording a collaborative session includes two phases. One is performed in real-time and includes determining portions of a composite image of collaborative session content that are constant over time or preprocessed. The portions are removed from the composite image of the collaborative session content. Remaining content of the composite image and any of the portions not already compressed is compressed and stored. A second phase is performed when off-line and includes decoding the remaining content of the composite image and the portions to reconstruct the composite image of the collaborative session content and formatting the composite image.

20 Claims, 2 Drawing Sheets

(51) Int. Cl.
*H04N 5/76* (2006.01)
*H04N 9/804* (2006.01)
*H04N 9/82* (2006.01)
*H04N 19/50* (2014.01)
*H04N 19/96* (2014.01)
*H04N 19/137* (2014.01)
*H04N 19/17* (2014.01)

(56) References Cited

U.S. PATENT DOCUMENTS

| | | |
|---|---|---|
| 7,506,253 B2 | 3/2009 | Armstrong et al. |
| 7,532,231 B2 | 5/2009 | Pepperell et al. |
| 7,653,705 B2 | 1/2010 | Gudipaty et al. |
| 2004/0187124 A1* | 9/2004 | Labelle .................. 718/100 |
| 2005/0038700 A1* | 2/2005 | Doemling et al. ............. 705/14 |
| 2007/0109411 A1 | 5/2007 | Jung et al. |
| 2007/0177022 A1 | 8/2007 | Mowry |
| 2008/0144073 A1* | 6/2008 | Griesemer et al. .......... 358/1.15 |
| 2008/0255687 A1 | 10/2008 | Eppolito |
| 2010/0017885 A1 | 1/2010 | Cohen et al. |

OTHER PUBLICATIONS

Hilt, V., et al. "Recording and Playing Back Interactive Media Streams" IEEE Transactions on Multimedia, vol. 7, No. 5. Dec. 2005. pp. 1-12.

Richardson, T., et al. "Virtual Network Computing" IEEE Internet Computing. 1998 IEEE. vol. 2, No. 1. Jan.-Feb. 1998. pp. 33-38.

Wiegand, T., et al. "Joint Video Team (JVT) of ISO/IEC MPEG & ITU-T VCEG: Information Technology—Coding of Audio-Visual Objects—Part 10: Advanced Video Coding" Joint Video Team (JVT) of ISO/IEC MPEG & ITU-T VCEG—8th Meeting. May 2003. pp. i-253.

* cited by examiner

SYSTEM AND METHOD FOR RECORDING COLLABORATIVE INFORMATION

RELATED APPLICATION DATA

This application is a Continuation application of co-pending U.S. patent application Ser. No. 12/784,709 filed on May 21, 2010, incorporated herein by reference in its entirety.

BACKGROUND

1. Technical Field

The present invention relates to collaborative information collection and recording, and more particularly to efficiently recording collaborative audio-visual documents.

2. Description of the Related Art

Collaboration systems typically combine audio/video conferencing with one or more objects that conference participants collaborate on. One type of collaboration is, for example, screen-sharing, but the system may also be a mash-up of many objects including video windows. The collaboration screen thus consists of several components, and is typically very large or even full screen, with a possibility of expanding to multiple screens.

Recording these collaboration screens in high quality is difficult and requires a large amount of memory and consumes a significant amount of computing resources. To be able to play back on existing audio/video players the recording is typically made as a single audio/video, where the audio and video are data compressed using standard encoding techniques, such as H.264 for video. The real-time encoding of a large video at a reasonable frame rate requires a large amount of CPU resources. For example, encoding a single 1280×960 frame with H.264 on a better-than-average computer with no special hardware may take up to 0.5 seconds. This means that a frame rate of only 2 frames can be achieved, while typically 15 or even up to 30 frames per second is required.

SUMMARY

A system and method for recording a collaborative session includes two phases. One is preferably performed in real-time and includes determining portions of a composite image of collaborative session content that are constant over time or preprocessed. The portions are removed from the composite image of the collaborative session content. Remaining content of the composite image and any of the portions not already compressed is compressed and stored. A second phase is performed preferably when off-line and includes decoding the remaining content of the composite image and the portions to reconstruct the composite image of the collaborative session content and formatting the composite image.

Another method for recording a collaborative session includes determining visual components in a composite image that can be represented by a bit stream for reconstruction of their visual appearance and have a known position and size in the composite image; removing the visual appearance of those visual components from the composite image in an order that permits higher efficiency of data compression; compressing a resulting composite image including its corresponding audio stream; and storing a data compressed version of the composite image with element data streams, element data stream references, element composition information over time, and the audio stream. When off-line, the method includes decoding the data compressed version of the composite image using the data compressed composite image, the element streams, the element composition information over time, and the audio stream such that a representation of the collaborative session is reconstructed; and storing the representation of the composite image stream with the audio stream into a file stored in machine readable storage media.

A system for recording a collaborative session includes a recording device configured to record composite information in real-time during a collaborative session between two or more participants, the recording device being configured to determine constant or known representations in the composite information and remove the constant or known representations to enable more efficient compression of a resulting composite image. The recording device is configured to compress the resulting composite image with the constant or known representations removed and being configured to store in memory the compressed resulting composite image along with the removed constant or known representations and any previously compressed information in an intermediate format file. A decoder is configured to decode the intermediate format file to reconstruct the composite image of the collaborative session and format the composite image in a standard format file.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
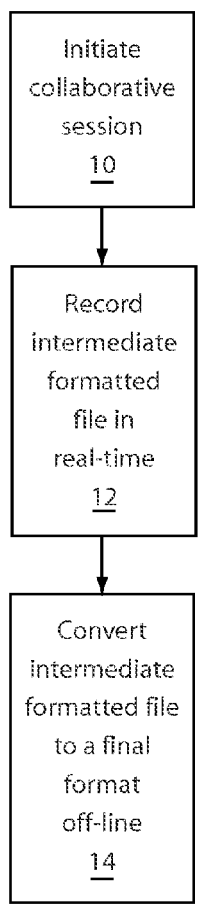
FIG. 1 is a block/flow diagram showing a system/method for recording a collaborative session in accordance with one embodiment.

In accordance with the present principles, a system and method for recording collaboration objects is provided. In one embodiment, the collaboration object may include content of a display screen. The present embodiments manage and control memory and computing resources needed by splitting a recording into two phases.

In a first phase, an intermediate recording format is created in real-time, while in a second phase the intermediate format is converted to a final format. The first phase can be done with very little computing resources while still maintaining a high level of data compression. The second phase need not be in real-time and can be performed on a same platform as the first phase recording, but may also be done elsewhere. In the first phase, the collaboration screen is split into a background and several components that are part of the screen. A component can, for example, be a video window, a document where the document can be described by a local file or by remote reference (e.g., by a URL), or other components.

The non-background components are extracted from the collaboration. The complexity of the collaboration screen sequence is reduced by removing those extracted components, after which the manipulated screen is data compressed and saved to an intermediate file. The data compression is specifically designed to need very little CPU resources, while still attaining a high level of data compression. The system and method use of some of the characteristics of a collaboration screen, including separate areas, such as, conference video windows, which are already encoded and need not be compressed again. The fact that during video conferencing the collaboration screen usually changes very little or even not at all for periods of time is also exploited, among other things.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram shows an illustrative system/method for recording a collaborative object in accordance with one embodiment. The system/method provides a scalable system that can handle a single session (e.g., with two collaborators) or a high number of recordings/sessions and participants per session simultaneously. The present embodiment provides for a high quality—large frame size, that may include multiple screens, high frame rate recording that may include a standard format (can play on standard players) with recordings which are independent of clients and the servers employed.

In block 10, a collaborative session is initiated. The session may include a telephone conference, a video conference, a webcast, an interactive computer session, a remote tutorial, a computer group collaboration or any other collaborative session or collaborative objects. In block 12, an intermediate formatted file is recorded for one or more collaborative objects in real-time using minimal resources. In one embodiment, the collaborative objects include one or more display screens or windows, an electronic white board, an image of a page with mark-ups, etc. In block 14, the intermediate format file is converted off-line to a final high quality recording.

Computer processing unit (CPU) and memory resources are conserved by intelligently recording the information presented. In a particularly useful embodiment, a baseline of the collaborative object is taken. For example, the background and static portions of the object are not encoded in the intermediate format. However, updates or dynamic portions are encoded in the intermediate format. The available bandwidth may be apportioned between the background and the updates to ensure a high resolution high quality collaborative object recording.

Figure 2:
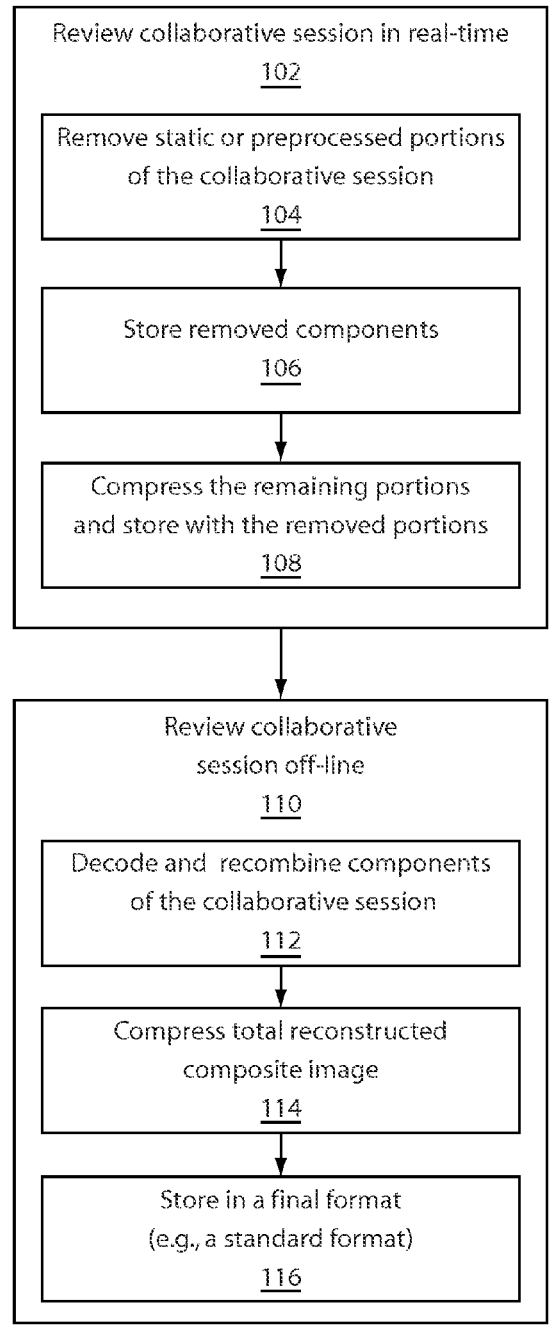
FIG. 2 is a block/flow diagram showing a system/method for recording a collaborative session in accordance with another embodiment.

Referring to FIG. 2, another system/method for recording a collaborative object is shown in greater detail. In block 102, in real-time, a complete collaboration session (e.g., a screen or object) is reviewed. In block 104, portions of session content which are static, or relatively static (e.g., do not change over a particular frame or time period) are removed. In addition, components which are already preprocessed, e.g., already compressed and do not need to be recompressed, can be removed. For example, all visual components for which coordinates are known and data is severable can be removed. This may include an entire window, a portion of a window, writing on a board that has been there for a while, background images, etc. Optionally, the type and/or amount of the components to be removed may be done in accordance with a priority list, or by using other constraints. For example, visual components in the composite collaborative object that can be identified for representation in a bit stream for reconstruction of their visual appearance and have a known position and size in the composite collaborative object image may have a higher priority then say a frequently updated window. This is optional and may be useful if memory is limited.

In block 106, the separate, known, old data which were removed are now stored as is. The visual appearances of those components from the composite image that are removed are removed so that the composite image can be data compressed more efficiently.

In block 108, the remaining collaboration screen is compressed or encoded as a differential from the previous background or the previous update. Any compression method may be employed, and preferably such method uses minimal computing resources and gets reasonable compression efficiency. In one embodiment, a quad-tree encoding may be employed, where if a square of 2×2 pixel values is all-zero, then that square is represented with a single 0. Otherwise, the square is represented by a single 1 followed by the 4 pixel values. The encoder goes up the hierarchy by combining 2×2 squares of 2×2 pixel values. If all four 2×2 squares were encoded with a 0, it is encoded with a zero, but if at least one was not, this is marked as a 1 followed by the encoding of the four 2×2 pixel squares. This process repeats until there are no more 2×2 squares.

Data compressing includes compressing a resulting composite image sequence. In addition, a mixed audio stream may be compressed as well. The compressed data composite image is stored. The compressed data may include, e.g., element data streams, element data stream references (URL's), element composition information over time, the mixed audio stream, etc. The compressed data composite image may be in an intermediate format as described above.

In block 110, in a second off-line stage, the data is again reviewed. The data is read from a file of the data compressed composite image, the element streams, the element size and position over time, the mixed audio stream, etc. Using positions and sizes of the element streams over time, the reconstructed element stream visuals will be inserted into the decoded composite image streams.

In block 112, all separated data, known or old (background) data and the decoded partial collaboration screen (differential or updated data) are recombined. This may include decoding the compressed composite image stream and reconstructing (which may include decoding) removed components (e.g., the visual or other representations of the element streams or other components).

In block 114, a total reconstructed composite image stream is compressed. The recombined data is re-encoded and stored in high quality as, for example, a standard audio/video file in block 116.

Advantageously, the two phases for recording a collaboration employ minimal real-time resources, and thus provide scalability. Knowledge of the structure of a collaboration object or screen is employed to reduce the real-time resources needed to record the collaboration. This also helps in permitting a high quality audio/video to be provided, preferably in a standard format.

Figure 3:
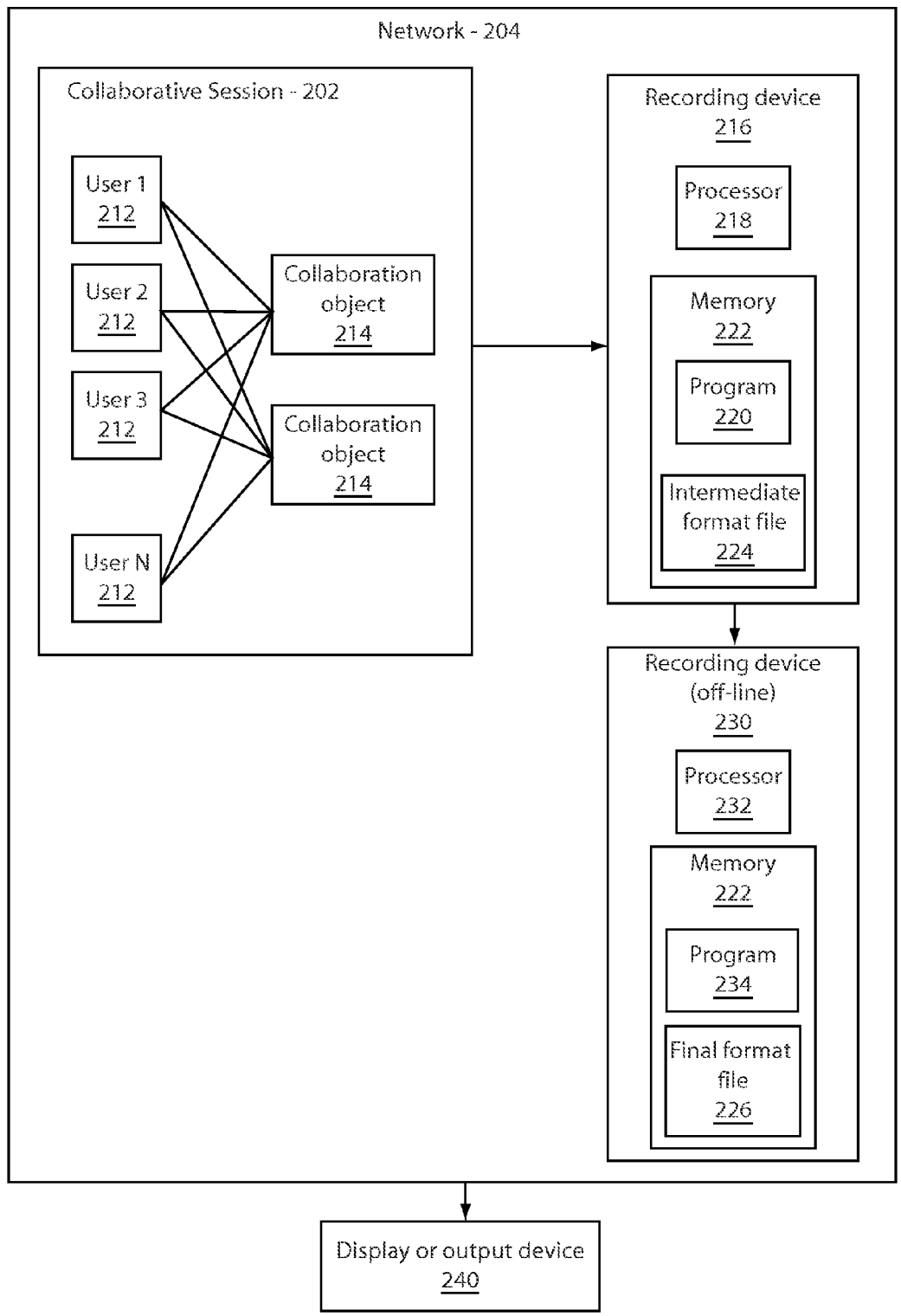
FIG. 3 is a block diagram showing a system for recording a collaborative session in accordance with yet another embodiment.

Referring to FIG. 3, an illustrative system 200 is depicted, which is configured for carrying out a collaborative session 202. In this illustrative example, the session 202 will be described in terms of a video conference conducted over a network 204. The network 204 may include a local area network, a wide area network, a cable network, a telephone network (wired or wireless), a satellite network, or any other network or connection between two or more users 212 may collaborate on one or more collaboration objects 214. The collaboration objects 214 may include an electronic document, an electronic white board, a portion of a video screen, a paper document, an audio file or any other image or object which can be viewed by the participants of the session 202 concurrently including any updates made to the object(s) 214.

FIG. 3 shows N users 212 each having access to collaboration objects 214. The users 212 can view (or listen to) the objects 214 and any updates to the objects 214 made by any of the users 212. A real-time recording device 216 includes a processor 218 and a program 220 for determining components in a composite session (video, data, voice or other audio, etc.) that can be represented by a bit stream for reconstruction of their visual appearance and have a known position and size in a composite image. These components may include compressed images, data or voice, for example. The appearance of these determined components from the composite image are removed in such a way that the composite can be data compressed more efficiently using the processor 218 and/or the program 220. For example, compressed images or data need not be compressed again and may be streamed directly for recording in memory 222 of recording device 216. The processor 218 and/or the program 220 data compress the resulting composite image sequence and a mixed audio stream, if present. The data compressed composite image, element data streams, element data stream references (URL's), element composition information over time, mixed audio stream, etc. are stored in memory 222. The data at this stage may be configured into an intermediate format file 224. The intermediate format may include a standard format.

An off-line recording device 230 may be a separate device from module 216, but may be included in or be the same device as the real-time recording device 216. The off-line recording device 230 will be illustratively described as a separate device to better illustrate one embodiment in accordance with the present principles. The intermediate format file 224 is to be converted into a final file 226 which may have a different format. Preferably, the final file 226 includes a standard format (e.g., a DVD format, such as MPEG). The off-line recording device 230 includes processor 232 and program 234. The processor 232 and/or program 234 are configured to read the data compressed composite image file 224 and all of its component streams and decoding the compressed composite image stream file 224. The file 224 is reconstructed to produce the determined components as described above, e.g., the representations of the element streams. Using the element stream position and size over time, the components are reassembled into a decoded composite image stream. The processor 232 and/or program 234 may then data compress a total reconstructed composite image stream and store the data compressed reconstructed composite image stream with the mixed audio stream into the file 226. The file 226 may be replayed on any compatible display device 240.

Having described preferred embodiments of a system and method for recording collaborative information (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for recording a collaborative session, comprising:
    removing portions of a composite image of collaborative session content that are constant over time or preprocessed in a storable format from the composite image of the collaborative session content; and
    storing remaining content of the composite image and any of the portions not already compressed on a storage media.

2. The method as recited in claim 1, further comprising: reconstructing the composite mage by decoding the remaining content of the composite image and the portions to image of the collaborative session content.

3. The method as recited in claim 1, further comprising formatting the composite image for storage on a storage media.

4. The method as recited in claim 1, wherein removing the portions includes determining portions of a bit stream that have a known position and size in the composite image.

5. The method as recited in claim 1, wherein removing the portions includes determining element stream portions which are already compressed.

6. The method as recited in claim 1, wherein the portions include at least one of: element data streams, element data stream references, element composition information over time, and an audio stream.

7. The method as recited in claim 1, wherein storing includes compressing and storing to a file having an intermediate format.

8. The method as recited in claim 1, wherein the collaborative session content includes one or more of video, still images, data, and audio.

9. A non-transitory computer readable storage medium comprising a computer readable program for recording a collaborative session, wherein the computer readable program when executed on a computer causes the computer to execute steps of:
    removing portions of a composite image of collaborative session content that are constant over time or preprocessed in a storable format from the composite image of the collaborative session content; and
    storing remaining content of the composite image and any of the portions not already compressed on a storage media.

10. The computer readable storage medium as recited in claim 9, further comprising: reconstructing the composite mage by decoding the remaining content of the composite image and the portions to image of the collaborative session content.

11. The computer readable storage medium as recited in claim 9, further comprising formatting the composite image for storage on a storage media.

12. The computer readable storage medium as recited in claim 9, wherein removing the portions includes determining portions of a bit stream that have a known position and size in the composite image.

13. The computer readable storage medium as recited in claim 9, wherein removing the portions includes determining element stream portions which are already compressed.

14. The computer readable storage medium as recited in claim 9, wherein the portions include at least one of: element data streams, element data stream references, element composition information over time, and an audio stream.

15. The computer readable storage medium as recited in claim 9, wherein storing includes compressing and storing to a file having an intermediate format.

16. The computer readable storage medium as recited in claim 9, wherein the collaborative session content includes one or more of video, still images, data, and audio.

17. A device for recording a collaborative session, comprising:
    a recording device configured to record composite information in real-time during a collaborative session between two or more participants, the recording device being configured to determine constant or known representations in the composite information and remove the constant or known representations to enable more efficient compression of a resulting composite image; the recording device being configured to compress the resulting composite image with the constant or known representations removed and being configured to store in memory the compressed resulting composite image along with the removed constant or known representations and any previously compressed information in an intermediate format file.

18. The system as recited in claim 17, further comprising a decoder configured to decode the intermediate format file to reconstruct the composite image of the collaborative session and format the composite image in a standard format file.

19. The system as recited in claim 17, wherein the constant or known representations include one or more of: a bit stream having a known position and size in the composite image; an element stream which is already compressed; element data streams; element data stream references; element composition information over time; and an audio stream.

20. The system as recited in claim 19, wherein the composite information includes one or more of video, still images, data, and audio.

* * * * *